United States Patent [19]

Nomura et al.

[11] Patent Number: 6,013,716
[45] Date of Patent: Jan. 11, 2000

[54] AROMATIC POLYSULFONE RESIN COMPOSITION

[75] Inventors: Hideo Nomura, Funabashi; Mituo Maeda, Tsukuba, both of Japan

[73] Assignee: Sumitomo Chemical Company, Limited, Osaka, Japan

[21] Appl. No.: 09/079,199

[22] Filed: May 15, 1998

[30] Foreign Application Priority Data

May 16, 1997 [JP] Japan ..................................... 9-126886

[51] Int. Cl.$^7$ ........................................................ C08K 3/40
[52] U.S. Cl. ........................ 524/494; 524/492; 524/493; 525/906; 428/378; 428/391
[58] Field of Search ................................... 524/492, 493, 524/494; 428/378, 391; 525/906

[56] References Cited

U.S. PATENT DOCUMENTS

| | | | |
|---|---|---|---|
| 3,792,114 | 2/1974 | Lauchlan | 525/906 |
| 4,301,052 | 11/1981 | Pollman | 260/29.2 |
| 4,659,753 | 4/1987 | Tiburtius | 523/209 |

FOREIGN PATENT DOCUMENTS

| | | | |
|---|---|---|---|
| 1158072 | 6/1989 | Japan | 523/156 |
| 2140267 | 5/1990 | Japan | 524/494 |

OTHER PUBLICATIONS

Murphy, Additives for Plastics Handbook, Elsevier Advanced Technology, pp. 54–60, 1996.

*Primary Examiner*—David W. Wu
*Attorney, Agent, or Firm*—Birch, Stewart, Kolasch & Birch, LLP

[57] ABSTRACT

Provided is an aromatic polysulfone resin composition comprising 100 parts by weight of an aromatic polysulfone resin compounded with 5 to 240 parts by weight of glass fiber whose surface is treated with an urethane resin. The aromatic polysulfone resin composition is extremely useful as a material for heat-resistant usage including electronic and electric parts because of excellent heat resistance, excellent mechanical properties, high heat stability during mold-procession and low level of gas occluded in the resulting molded article.

13 Claims, No Drawings

AROMATIC POLYSULFONE RESIN COMPOSITION

BACKGROUND OF THE INVENTION

1. Technical Field of the Invention

The present invention relates to a glass fiber-filled aromatic polysulfone resin composition which has excellent heat resistance and mechanical properties, high heat stability during mold-processing, and low level of occluded gas in the molded article.

2. Description of the Related Art

Aromatic polysulfone resins, being amorphous, are isotropic and have a small mold shrinkage factor. They are materials suitable for electronic parts for which high dimensional stability and high heat resistance are required, owing to the facts that they have a higher glass transition temperature than other high heat resistance resins such as polyphenylene sulfides or polyether ketones and thus keep properties, such as mechanical strength, elasticity and creep resistance, at a less lowered level up to a higher temperature as compared with said other resins. Particularly, a material comprising an aromatic polysulfone resin compounded with a fibrous material such as glass fiber has a decreased mold shrinkage factor and improved strength and elasticity and therefore is applied, for example, to relays, switches, connectors, sockets and coil bobbins.

Since aromatic polysulfone resins have relatively high melt viscosity, they need a higher molding temperature, injection pressure and molding speed, when they are used for injection molding of electronic parts having a small size and a complicated shape or electronic parts having a thin thickness region. Therefore, decomposed gas may evolve by heat or the melting viscosity may increase by cross linking reaction during mold-processing. In the case that the resin is retained in a molding machine, gelation may occur sometimes. Furthermore, a part of the decomposed gas evolved during mold-processing is occluded in the molded products. Said occluded gas may be released from the molded product upon practical use and may create various problems. In particular, when the electronic part is a relay (or case, base, armature or coil bobbin) and the occluded gas is a corrosive gas, a problem may be created that metal contacts are corroded to cause insulation failure even if the released amount of occluded gas is very small.

An object of the present invention is to provide a glass fiber filled-aromatic polysulfone resin composition having excellent heat resistance and excellent mechanical properties, high heat stability during mold-processing, and low level of occluded gas in the resulting molded article.

This object could be accomplished by compounding an aromatic polysulfone resin with a specific amount of specific surface-treated glass fiber.

Namely, the present invention is as follows.

(1) An aromatic polysulfone resin composition comprising 100 parts by weight of an aromatic polysulfone resin compounded with 5 to 240 parts by weight of glass fiber having a surface treated with a urethane resin.

(2) The aromatic polysulfone resin composition described in item (1), wherein the fiber diameter of the glass fiber after compounding is from 1 to 20 μm and the number-average fiber length is from 25 to 6000 μm.

(3) The aromatic polysulfone resin composition described in item (1) or (2), wherein the amount of the urethane resin adhered to the glass fiber is from 0.01 to 5 parts by weight based on 100 parts by weight of the glass fiber.

(4) The aromatic polysulfone resin composition described in item (1), (2) or (3), wherein the aromatic polysulfone resin comprises at least 80 mol % of a repeating unit represented by the following formula:

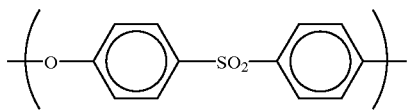

The aromatic polysulfone resin is defined as a polyarylene compound in which three units of an arylene unit, an ether bond and a sulfone bond are essential constitutional units and in which the arylene units are disorderly or orderly arranged together with the ether and sulfone bonds. Typical examples include, without limitation, those having the following repeating units.

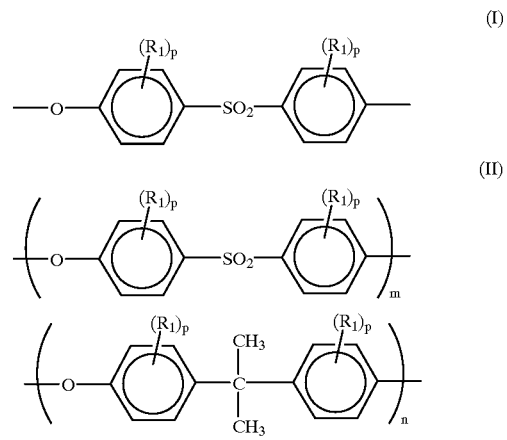

wherein the polymer comprising the structural unit (II) includes random copolymers; $R_1$ represents an alkyl group of 1 to 6 carbon atoms, an alkenyl group of 3 to 10 carbon atoms, a phenyl group or a halogen atom; p is an integer of 0 to 4; m and n indicate the average number of repeating units and are positive numbers of 0.1–100; $R_1$ groups on the same or different nuclei may be different from one another; and p integers may be different from one another.

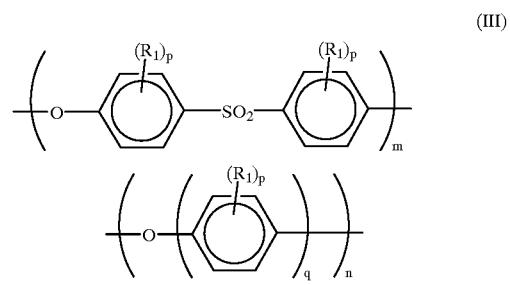

wherein the polymer comprising the structural unit (III) includes random copolymers; $R_1$ represents an alkyl group of 1 to 6 carbon atoms, an alkenyl group of 3 to 10 carbon atoms, a phenyl group or a halogen atom; p is an integer of 0 to 4; q, m and n indicate the average number of repeating units and q is a positive number of 1–3, and m and n are positive numbers of 0.1–100; $R_1$'s on the same or different nuclei may be different with one another; and p integers may be different from one another.

It is preferred that, in the aromatic polysulfone resin used in the present invention, m/(m+n) in the structural unit in (II)

is 0.8 or more; and it is preferred that m/(m+n) in the structural unit (III) is 0.8 or more and q is 1.

Among the resins, the preferred one has repeating structural units (I) and (II). Examples include SUMIKAEXCEL PES 3600P and 4100P (trade names), manufactured by Sumitomo Chemical Co., Ltd., having (I), and UDELP-1700 (trade name), manufactured by AMOCO, having (II). Among them, aromatic polysulfones having a repeating structural unit (I) are particularly preferred.

The terminal structure of the aromatic polysulfone resins used in the present invention depends on the process for producing each resin and include, without limitation, Cl, OH and OR (wherein R is an alkyl group).

The glass fiber whose surface is treated with an urethane resin used in the present invention is not specifically limited as far as the surface of the glass fiber is coated with an urethane resin. The glass fiber refers to those obtained by processing glass containing a silicate salt as a main component in the form of fiber. Examples of the glass include general alkali glass (A-glass), chemical acid-resistant glass (C-glass), low-density glass (D-glass), borosilicate glass (E-glass). E-glass is preferred as those used in the present invention. In the production of the glass fiber, a method of spinning glass in molten state (not less than 1300° C.) is generally used.

In addition, the urethane resin is not specifically limited as far as it is a polymer having an urethane bond (—NHCOO—).

The surface treatment of the glass fiber using an urethane resin also operates as a bundling treatment of the glass fiber, and a procedure thereof includes a method of dipping the melt-spun glass fiber in an emulsion of a polyurethane precursor and optionally heat-curing the fiber. The emulsion of the polyurethane precursor includes an isocyanate alone or a mixed solution of the isocyanate and a polyol, or those optionally containing a catalyst such as amine, etc. Examples of the isocyanate include tolylene diisocyanate (TDI), diphenylmethane diisocyanate (MDI) and naphthalene diisocyanate (NDI), and examples of the polyol include polyether polyol and polyester polyol, without being limited thereto.

In the present invention, the amount of the urethane resin adhered to the glass fiber is preferably from 0.01 to 5 parts by weight, more preferably from 0.02 to 3 parts by weight, based on the glass fiber. The amount of a surface treating agent can be calculated by the measurement of an ignition loss defined in JIS R3420. When the amount of the surface treating agent is less than 0.01 parts by weight, the bundling effect during the spinning is insufficient and, therefore, it becomes difficult to compound the glass fiber with the aromatic polysulfone resin, unfavorably. On the other hand, when the amount is more than 5 parts by weight, the amount of the decomposed gas of the surface treating agent itself increases, resulting in deterioration of the heat stability, unfavorably.

In the present invention, the shape of the glass fiber whose surface is treated with an urethane resin is not specifically limited, but the fiber diameter is preferably from 1 to 20 $\mu$m, more preferably from 5 to 15 $\mu$m. When the fiber diameter is smaller than 1 $\mu$m, the bundling effect during spinning is insufficient and, therefore, it becomes difficult to compound the glass fiber with the aromatic polysulfone resin, unfavorably. On the other hand, when the fiber diameter is larger than 20 parts by weight, the hauling property of a strand becomes unstable during the melt-granulation of the composition, unfavorably.

Furthermore, the number-average fiber length of the glass fiber whose surface is treated with an urethane resin is preferably from 25 to 6000 $\mu$m, more preferably from 30 to 3000 $\mu$m. When the number-average fiber length is shorter than 25 $\mu$m, the reinforcing effect by the glass fiber is lowered, unfavorably. On the other hand, when the fiber length is longer than 6000 $\mu$m, the hauling property of a strand become unstable during the melt-granulation of the composition and, furthermore, the surface of the product molded from the resulting composition is deteriorated, unfavorably.

In the present invention, the amount of the glass fiber whose surface is treated with an urethane resin, which is compounded with 100 parts by weight of the aromatic polysulfone, is from 5 to 240 parts by weight, preferably from 10 to 160 parts by weight. When the amount of the glass fiber whose surface is treated with an urethane resin used in the present invention is more than 240 parts by weight, the biting property into a screw during the granulation becomes inferior and, at the same time, the plasticization during mold processing becomes unstable. Furthermore, a reduction in mechanical strength and deterioration of the appearance of the molded article arise, unfavorably. On the other hand, when the amount of the glass fiber whose surface is treated with an urethane resin is less than 5 parts by weight, the mechanical strength of the molded article is insufficient, unfavorably.

In the present invention, it is possible to add one or more additives, for example, fiber or needle reinforcers such as silica alumina fiber, alumina fiber, carbon fiber and aluminum borate whisker; inorganic fillers such as talc, mica, clay and glass beads; release modifiers such as fluororesin and metallic soap; colorants such as dye and pigment; antioxidants, heat stabilizers, ultraviolet absorbers, antistatic agents and surfactants.

Furthermore, it is also possible to add a small amount of one or more thermoplastic resins such as polyamide, polyester, polyphenylsulfide, polyetherketone, polycarbonate, polyphenylene ether and its modified product, polyetherimide, etc.; and thermosetting resins such as phenol resin, epoxy resin, polyimide resin, etc.

A means of compounding raw materials for obtaining the resin composition of the present invention is not specifically limited. In general, an aromatic polysulfone resin, a glass fiber whose surface is treated with an urethane resin and, according to the requirement, an inorganic filler, a release modifier, a heat stabilizer, etc. are mixed by using a Henschel mixer, a tumbler etc., followed by melt-kneading using an extruder. In the melt-kneading, all raw materials may be fed to an extruder after mixing in one batch, or raw materials such as reinforcing materials (e.g. glass fiber), inorganic fillers and raw materials mainly composed of resins may be separately fed.

EXAMPLES

The following Examples further illustrate the present invention in detail but are not to be construed to limit the scope thereof. Moreover, analysis of the amount of a corrosive gas evolved from the molded article in the Examples, measurement of various physical properties and evaluation of granulation properties were carried out according to the following methods.

(1) Tensile Strength:

An ASTM No. 4 dumbbell specimen was molded from the thermoplastic resin composition of the present invention by using an injection molding machine, and the tensile strength was measured according to ASTM D638.

(2) Flexural Modulus:

A specimen of a length of 127 mm, a width of 12.7 mm and a thickness of 6.4 mm was molded from the thermoplastic resin composition of the present invention by using an injection molding machine, and the flexural modulus was measured according to ASTM D790.

(3) Deflection Temperature Under Load:

A specimen of a length of 127 mm, a width of 12.7 mm and a thickness of 6.4 mm was molded from the thermoplastic resin composition of the present invention by using an injection molding machine, and the deflection temperature under load was measured under a load of 18.6 kg/cm² according to ASTM D648.

(4) Stability in Molten State:

Using a CFT-500 KOKA type flow tester manufactured by Shimadzu Corporation, the apparent melt viscosity was measured under a load of 50 kg by using an orifice of a diameter having 1 mm φ and a length of 10 mm after a specimen was heated and retained at 400° C.

(5) Degree of Amount of Corrosive Gas ($SO_2$) Evolved from Molded Article:

The aromatic polysulfone resin composition of the present invention was molded at a cylinder temperature of 360 to 370° C. and a mold temperature of 150° C. to form a plate of a length of 64 mm, a width of 64 mm and a thickness of 1 mm by using an injection molding machine (PS40E5ASE manufactured by Nissei Jushi Industry Co., Ltd.), and then the resulting molded article was cut into a chip of a length of 5 mm, a width of 5 mm and a thickness of 1 mm. This chip was put in a 20 ml vial which was washed with distilled water and then dried with hot-air. After 5 ml of ion-exchanged water was added in the vial, the vial was sealed with a packing of polytetrafluoroethylene. Then, stirring was performed at 80° C. for 20 hours and $SO_4^{2-}$ was extracted. After cooling, a determined amount of this extracted solution was subjected to ion chromatography (4510i type manufactured by DIONEX Co., column: AG4A+AS4A+ AMMS, elute: 1.8 mM-$Na_2CO_3$ 0.9 mM-$NaHCO_3$, flow rate: 1.5 ml/min) to detect $SO_4^{2-}$ and the amount of $SO_4^{2-}$ based on the weight of the chip was calculated. It is known that the corrosive gas $SO_2$ considered to be occluded in the molded article is completely oxidized to be converted into $SO_4^{2-}$ under the above extraction conditions. Therefore, the larger the amount of $SO_4^{2-}$ extracted from the molded article, the lager the amount of the corrosive gas to be evolved.

Examples 1a 1b and 2, and Comparative Example 1

Aromatic polysulfone resin powder (Sumicaexcel PES 360P manufactured by Sumitomo Chemical Industries Co., Ltd.) and glass fiber whose surface was treated with 0.3 or 0.5 parts by weight of an urethane resin were granulated at a cylinder temperature of 340° C. by using a twin extruder (PCM-30 manufactured by Ikegai Corporation.) to obtain aromatic polysulfone resin pellets. The pellets after granulation were burned at 600° C. and an image of an optical micrograph of the glass fiber as the residue was taken and then analyzed. As a result, the fiber diameter was 10 μm and the number-average fiber length was 180 μm. This aromatic polysulfone resin composition was molded at a cylinder temperature of 360° C. and a mold temperature of 150° C. by using an injection molding machine (PS40E5ASE manufactured by Nissei Jushi Industry Co., Ltd.) to form a specimen as described above. Then, the tensile strength, flexural modulus, Izod impact strength and deflection temperature under load were measured. The results are shown in Table 1. The aromatic polysulfone resin composition of the present invention showed excellent heat resistance and mechanical properties, excellent melt stability at high temperature and low amount of $SO_4^{2-}$ extracted from the molded article. Regarding those, wherein no glass fiber was filled (Comparative Example 1), the physical properties and deflection temperature under load were in low level.

Comparative Example 2

In the same manner as in Examples 1a and 1b except for using a glass fiber whose surface was treated with 0.4 parts by weight of an epoxy resin, the measurement was carried out. The results (Comparative Example 2) are shown in Table 1.

Regarding the composition of Comparative Example 2, the melt viscosity markedly increased by retaining at 400° C. Gelation arose after 30 minutes and, therefore, the measurement could not be carried out. In addition, the amount of $SO_4^{2-}$ extracted from the molded article was in markedly high level. Moreover, a slight reduction in mechanical properties and deflection temperature under load was recognized.

The aromatic polysulfone resin composition of the present invention is extremely useful as a material for heat-resistant usage including electronic and electric parts because of excellent heat resistance, excellent mechanical properties, high heat stability during mold-procession and low level of gas occluded in the resulting molded article.

TABLE 1

| | Aromatic polysulfone resin composition (parts by weight) | | | | | Deflection | Melt viscosity (poise/400° C.) | | | |
| | | Glass fiber (amount to be surface-treated: parts by weight) | | Tensile | Flexural | temperature | Retained | Retained | Retained | Amount |
| | Aromatic polysulfone | Urethane treatment | Epoxy treatment | strength (kg/cm²) | modulus (kg/cm²) | under load (° C.) | for 5 min. | for 10 min. | for 30 min. | of $SO_4^{2-}$ (ppm) |
|---|---|---|---|---|---|---|---|---|---|---|
| Example 1a | 100 | 43(0.3)*1 | 0 | 1430 | 86000 | 216 | 2190 | 2180 | 2180 | 2.6 |
| Example 1b | 100 | 43(0.5)*2 | 0 | 1410 | 85000 | 216 | 2210 | 2210 | 2200 | 2.8 |
| Example 2 | 100 | 100(0.3)*1 | 0 | 1580 | 129000 | 218 | 2880 | 2900 | 3010 | 1.3 |
| Comparative example 1 | 100 | 0 | 0 | 860 | 26000 | 203 | 980 | 970 | 980 | 4.1 |

TABLE 1-continued

| | Aromatic polysulfone resin composition (parts by weight) | | | | | | Melt viscosity (poise/400° C.) | | | |
| | | Glass fiber (amount to be surface-treated: parts by weight) | | Tensile | Flexural | Deflection | Retained | Retained | Retained | Amount |
| | Aromatic polysulfone | Urethane treatment | Epoxy treatment | strength (kg/cm$^2$) | modulus (kg/cm$^2$) | temperature under load (° C.) | for 5 min. | for 10 min. | for 30 min. | of SO$_4^{2-}$ (ppm) |
|---|---|---|---|---|---|---|---|---|---|---|
| Comparative example 2 | 100 | 0 | 43(0.5)*$^3$ | 1400 | 86000 | 216 | 2410 | 9680 | (Gelation) | 35 |

*$^1$: Urethan resin treated glass fiber, CS03MAPx-1 (fiber diameter 15 μm, number-average fiber length 3000 μm, manufactured by Asahi Fiber Glass Corp.)
*$^2$: Urethan resin treated glass fiber, RES03TP74 (fiber diameter 13 μm, number-average fiber length 3000 μm, manufactured by Nippon Sheet Glass Co.)
*$^3$: Epoxy resin treated glass fiber, RES03TP70 (fiber diameter 13 μm, number-average fiber length 3000 μm, manufactured by Nippon Sheet Glass Co., Ltd.)

What is claimed is:

1. An aromatic polysulfone resin composition comprising 100 parts by weight of an aromatic polysulfone resin compounded with 5 to 240 parts by weight of glass fiber having a surface treated with a urethane resin.

2. The aromatic polysulfone resin composition according to claim 1, wherein the fiber diameter of the glass fiber after compounding is from 1 to 20 μm and the number-average fiber length is from 25 to 6000 μm.

3. The aromatic polysulfone resin composition according to claim 1, wherein the amount of the urethane resin adhered to the glass fiber is from 0.01 to 5 parts by weight based on 100 parts by weight of the glass fiber.

4. The aromatic polysulfone resin composition according to claim 1, 2 or 3, wherein the aromatic polysulfone resin comprises at least 80 mol % of a repeating unit represented by the following formula:

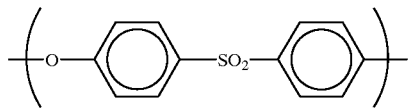

5. The aromatic polysulfone resin composition according to claim 3, wherein the amount of the urethane resin adhered to the glass fiber is from 0.02 to 3 parts by weight based on 100 parts by weight of the glass fiber.

6. The aromatic polysulfone resin composition according to claim 1, wherein the fiber diameter of the glass fiber after compounding is from 5 to 15 microns and the number average fiber length is from 25–6000 microns.

7. The aromatic polysulfone resin composition according to claim 1, wherein the fiber diameter of the glass fiber after compounding is from 1–20 microns and the number average fiber length is from 30–3000 microns.

8. The aromatic polysulfone resin composition according to claim 1, wherein the fiber diameter of the glass fiber after compounding is from 5–15 microns and the number average fiber length is from 30–3000 microns.

9. The aromatic polysulfone resin composition according to claim 1, compounded with 10–160 parts by weight of glass fiber.

10. The aromatic polysulfone resin composition according to claim 1, wherein the aromatic polysulfone resin has the following repeating units:

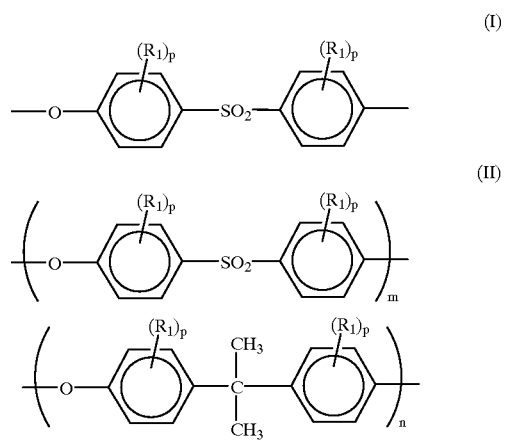

wherein the polymer comprising the structural unit (II) includes random copolymers; $R_1$ represents an alkyl group of 1–6 carbon atoms, an alkenyl group of 3 to 10 carbon atoms, a phenyl group or a halogen atom; p is an integer of 0 to 4; m and n indicate the average number of repeating units and are positive numbers of 0.1–100; $R_1$ groups on the same or different nuclei may be different from one another; and the p integers may be different from one another.

11. The aromatic polysulfone resin composition according to claim 1, wherein the aromatic polysulfone resin has the following repeating units:

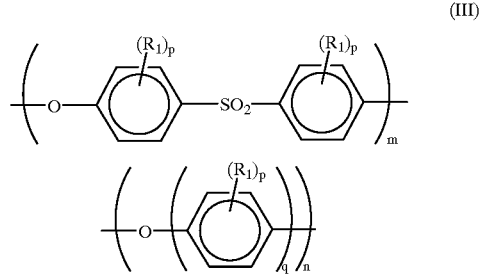

wherein the polymer comprising the structural unit (III) includes random copolymers; $R_1$ represent an alkyl group of 1–6 carbon atoms, an alkenyl group of 3–10 carbon atoms, a phenyl group or a halogen atom; p is an integer of 0 to 4; q, m and n indicate the average number of repeating units and q is a positive number of 1–3, and m and n are positive numbers of 0.1–100; $R_1$ groups on the same or different nuclei may be different with one another; and the integers may be different from one another.

12. The aromatic polysulfone resin composition according to claim 10, wherein m/(m+n) in the structural unit in formula (II) is 0.8 or more.

13. The aromatic polysulfone resin composition according to claim 11, wherein m/(m+n) in the structural unit in formula (III) is 0.8 or more and q is 1.

* * * * *